United States Patent [19]

Chestnut

[11] Patent Number: 4,497,129

[45] Date of Patent: Feb. 5, 1985

[54] FISHERMAN'S ACCESSORY

[76] Inventor: Billy D. Chestnut, Rte. #1, Box 299, Magnoli, N.C. 28453

[21] Appl. No.: 443,879

[22] Filed: Nov. 23, 1982

[51] Int. Cl.³ .............................................. A01K 97/10
[52] U.S. Cl. ........................................ 43/21.2; 43/55; 248/156
[58] Field of Search ............... 43/21.2, 55, 54.1, 4, 43/1; 248/156

[56] References Cited

U.S. PATENT DOCUMENTS

| 1,515,078 | 11/1924 | Shee | 248/156 |
| 1,654,876 | 1/1928 | Hemming | 43/21.2 |
| 1,857,072 | 5/1932 | Wilson | 43/55 |
| 2,520,450 | 8/1950 | Austin | 248/156 |
| 2,903,814 | 9/1959 | Greer | 43/55 |
| 3,159,366 | 12/1964 | Knight | 43/21.2 |
| 3,344,551 | 10/1967 | Chestnut | 43/55 |
| 3,560,969 | 2/1971 | Fleeman | 43/21.2 |

Primary Examiner—Gene P. Crosby
Attorney, Agent, or Firm—John B. Dickman, III

[57] ABSTRACT

A fishing device having a ground inserted post for supporting a fishing rod holder is disclosed where the fishing rod holder is made of an integrally molded plastic and includes in combination a bait box and cutting board where the cutting board forms the bottom of the bait box. There are triangular supports to brace the bait box and cutting board and a slot for a bait knife.

3 Claims, 4 Drawing Figures

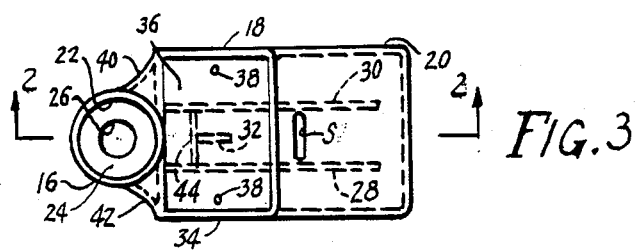
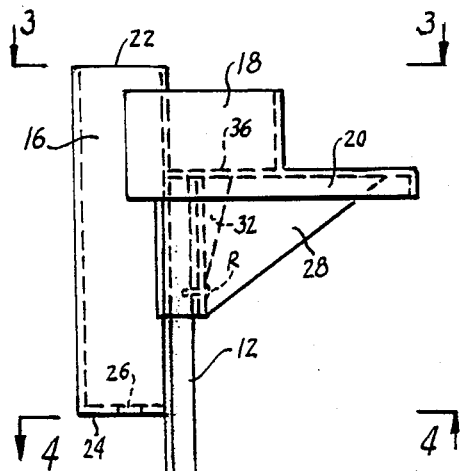
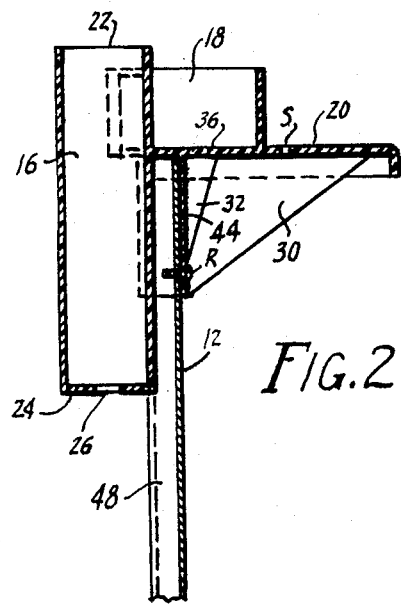
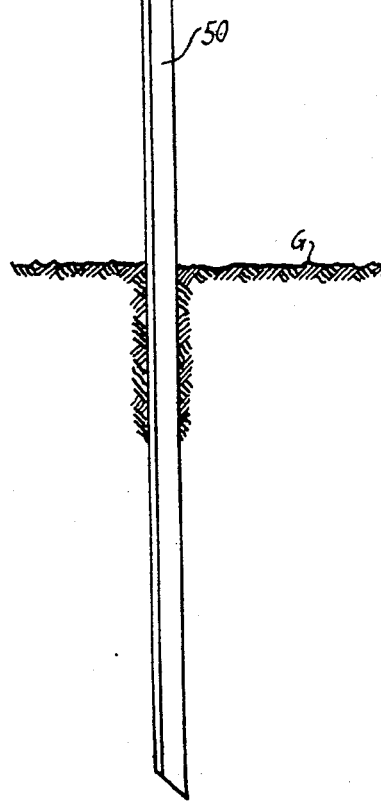

1

FISHERMAN'S ACCESSORY

BACKGROUND OF THE INVENTION

The present invention relates to a fishing rod support for surf fishing which includes a bait box and cutting board, and, in particular, to a fishing rod support including in combination, a bait box and cutting board wherein the fishing rod support and combined bait box and cutting board are integrally molded as a unit.

In my prior patent, U.S. Pat. No. 3,344,551, the rod support and combined bait box and cutting board were made of separate elements joined together in a completed unit with the cutting board forming the bottom of the bait box. The rod holder and combined bait box were separately fastened to the vertical post. While this device functions well for its intended purpose, I have found that in manufacturing the device, that the cost of materials and labor for assembling the device is high.

Since the bottom of the bait box and the cutting board is one is the same piece, it must be firmly attached to the walls of the bait box such that the cutting board will withstand the pressure from cutting bait. This is because there is no other support for the cutting board.

My above cited patent is the closest known patent to the present invention, however, a search of the patented devices developed the following patented devices:

1,515,078—Shee;
1,654,876—Hemming;
1,857,072—Wilson;
2,520,450—Austin;
2,877,328—Barnette;
2,903,814—Greeg;
3,159,366—Knight;
1,088,975—France, 9/54;
1,114,248—France, 12/55.

SUMMARY OF THE INVENTION

The present fishing device consists of a fishing rod holder and a combined bait box and cutting board consisting of:

a ground engaging post;
a cylindrical rod holder opened at one end to receive a fishing rod and partially closed at the other end to support the fishing rod;
a rectangled bait box having four walls and a bottom;
a cutting board having a horizontal surface; and
said cutting board forming the bottom of said bait box, as well as a cutting board for bait, wherein said rod holder, bait box and cutting board are integrally formed as a unit with a receiving slot for said ground engaging post.

DESCRIPTION OF THE DRAWINGS

FIG. 1 is a side plan view of the fishing device of the present invention.

FIG. 2 is a cross-sectional view taken along the line 2—2 of FIG. 1.

FIG. 3 is a top plan view of the present invention.

FIG. 4 is a bottom plan view of the present invention.

DISCLOSURE OF THE INVENTION

Referring to the drawings, and, in particular, to FIG. 1, there is shown a fishing device supported on a ground engaging post 12. The post 12 can be made of metal, wood, or plastic with a pointed end. A metal angle iron post has been formed to work well with the present invention, however, any post which has a triangular cross-section would also work. The fishing device includes a fishing rod support 16, a bait box 18 and a cutting board 20 integrally molded as a unit from a plastic material.

The fishing rod support 16 is a cylindrical tube opened at end 22 and partially closed at the other end by a bottom 24, FIG. 2. There is a drain hole 26 in the bottom 24 to prevent the rod support 16 from being filled with water.

Molded to the fishing rod support 16 is the combined bait box 18 and cutting board 20. The cutting board 20, best seen in FIG. 2, which also forms the bottom of the bait box, is braced by triangular supports 28, 30 and 32. Supports 28 and 30, FIGS. 2 and 4, extend under the cutting surface of the cutting board while support 32 extends under the bait box. With this arrangement, not only is the cutting board 20 well supported near its free end, but the portion of the cutting board forming the bottom of the bait box 18 is well supported by the addition of support 32. The cutting board 20 is further supported by a skirt 33, FIG. 4.

The bait box 18, has vertical upright walls 34 which may be square or rectangular in shape. The bottom 36 has a pair of drain holes 38 so that the box does not fill with water.

In order to provide good support for the fishing rod support 16 and the combined bait box 18 and cutting board 20, a pair of arcuate supports 40 and 42 are integrally molded therebetween, as shown in FIG. 3. It should be further noted that supports 28 and 30 are molded directly to the rod support 16 for supporting the cutting board 20. There is also a cross-member 44 between the supports 28 and 30 to which support 32 is molded. The area formed by the rod support 16, the supports 28 and 30, and cross-member 44 forms a slot in which the post 12 is inserted. Because of the curvature of the rod support 16, an angled post with legs 48 and 50 will fit tightly in the slot.

With the present fishing device, the post 12 can be inserted in said slot until the top of the post contacts the bottom surface of the cutting board 20. Once the post 12 is fully inserted, a fastener, such as a rivet R, affixes the fishing device 10 to the post 12. Due to the closeness of fit of the post 12 in said slot, a single fastener R will hold the unit together.

As stated, the fishing device is molded as an integral unit of a plastic material such as a synthetic plastic with either thermoplastic or thermosetting properties just so the plastic will stand up under constant use for the intended purposes of the fishing device.

A bait knife slot S is provided in the cutting board 20 to support the knife (not shown) when not being used.

It should be understood that while only one embodiment of the invention has been disclosed, that one skilled in the art may realize other embodiments of the invention, therefore, for a full understanding of the invention, one should understand the description and drawings in light of the claims.

I claim:

1. A fishing device for supporting a fishing rod comprising:

a ground engaging post;
a cylindrical rod holder opened at one end to receive a fishing rod and at least partially closed at the other end to support the fishing rod;
a combined bait box and cutting board integral with said rod holder;

said bait box having four walls forming a square box and a bottom;

said cutting board having a horizontal surface for cutting where said cutting board has a portion forming the bottom of said bait box; and a slot in said fishing device for receiving said ground engaging post, said cutting board has a pair of support means extended from said rod holder at an angle to a point under the cutting surface, and a third support extending from said rod holder at an angle to a point under said bait box bottom portion.

2. A fishing device as in claim 1 wherein said post receiving slot is formed by the rod holder, the pair of supports, and a cross-member between the pair of supports, whereby the post is inserted to where it contacts the bait box bottom and is fastened to said fishing device.

3. A fishing device as in claim 1 wherein said cutting board has a bait knife support slot.

* * * * *